(12) United States Patent
Barkai et al.

(10) Patent No.: US 6,832,608 B2
(45) Date of Patent: Dec. 21, 2004

(54) GETTER SUPPORT ASSEMBLY FOR A SOLAR ENERGY COLLECTOR SYSTEM

(75) Inventors: Menashe Barkai, Tel Aviv (IL); Shmuel Klapwald, Jerusalem (IL); Yoel Schwartzman, Shoham (IL); Eli Mandelberg, Tel Aviv (IL); Rami Ezer, Ramat Gan (IL)

(73) Assignee: Solel Solar Systems Ltd., Jerusalem (IL)

( * ) Notice: Subject to any disclaimer, the term of this patent is extended or adjusted under 35 U.S.C. 154(b) by 0 days.

(21) Appl. No.: 10/640,397

(22) Filed: Aug. 14, 2003

(65) Prior Publication Data
US 2004/0134484 A1 Jul. 15, 2004

(30) Foreign Application Priority Data

Jan. 9, 2003 (IL) ................................. 153872

(51) Int. Cl.[7] ................................. F24J 2/24
(52) U.S. Cl. ...................... 126/653; 126/657
(58) Field of Search ................. 126/653, 657, 126/652, 680, 684, 692, 694, 704, 705, 708

(56) References Cited

U.S. PATENT DOCUMENTS

| 2,523,016 A | 9/1950 | Hamvas |
| 4,306,543 A | 12/1981 | Doevenspeck et al. |
| 4,455,998 A | 6/1984 | Kroontje et al. |
| 4,508,104 A | 4/1985 | Takeuchi et al. |
| 4,579,107 A | 4/1986 | Deakin |

FOREIGN PATENT DOCUMENTS

JP          59-004850          1/1984

Primary Examiner—Jiping Lu
(74) Attorney, Agent, or Firm—Nath & Associates PLLC; Gary M. Nath; Marvin C. Berkowitz

(57) ABSTRACT

A getter support assembly for supporting getters in a focusing collector type solar collector system comprising a tube radiation absorber (TRA) and a glass enclosure tube, defining therebetween an annular space, and a solar radiation focusing reflector. The getter support assembly comprises a bridge formed with an elongated trough having a getter support portion. The bridge further comprising feet fixedly attached to the TRA supporting the trough so that the trough is spaced apart from the TRA. The trough further comprises a radiation reflecting surface facing the TRA for blocking radiation emitted from the TRA and missed solar radiation reflected from the reflector.

23 Claims, 3 Drawing Sheets

GETTER SUPPORT ASSEMBLY FOR A SOLAR ENERGY COLLECTOR SYSTEM

FIELD OF THE INVENTION

This invention is in the field of solar energy collecting systems of the so-called focusing collector type and is particularly concerned with support and thermal protection of getters fixed to the metal tube radiation absorbers of such solar energy systems.

The terms getter, getters and getter material will be used interchangeably hereinafter in the specification and claims.

BACKGROUND OF THE INVENTION

For reasons such as the rapid exploitation of non-renewable energy resources, the desire for environmentally friendly energy sources and the advantages to locally provide energy to remote communities and factories, there is a continued interest in solar energy systems and improvements thereto. Continuous research increases efficiency of solar systems which gradually become more cost effective and render them more favorable.

A particular type of solar collector system is the "focusing collector" type which enhances the effect of solar energy by focusing it onto a smaller area using mirrored surfaces or lenses. In this system, a reflector, which is typically parabolic, receives and reflects (focuses) incoming solar radiation onto a metal tube radiation absorber (TRA)—in the form of a tube; the TRA being concentrically surrounded by a treated glass enclosure tube to limit the loss of heat. To further increase the efficiency by increasing the collection of solar radiation, the collector system typically includes means to track the sun.

To minimize the loss of heat through convection and conduction and to improve the solar radiation collection efficiency, the space between the tube radiation absorber (TRA) and the glass enclosure tube is evacuated to very low pressure.

The TRA is made of metal with a coating having a high solar radiation absorption coefficient to maximize the energy transfer imparted by the solar radiation reflecting off the reflector. A heat transfer medium, which for practical considerations is typically a liquid such as oil, flows within the TRA.

At the high temperatures inherent of solar collectors, the heat transfer medium releases some amount of hydrogen. The hydrogen released, being such a small atom, may permeate through the wall of the TRA and enter the space between the TRA and the glass enclosure tube. This situation is very undesirable as it reduces the vacuum in that space thereby allowing heat loss from the TRA via convection and conduction. Accordingly, it is critical to remove this hydrogen to preserve the efficiency of the focusing solar collector.

One method for removing hydrogen from the space is by use of a getter located therein, which is a material that may comprise a variety of metal alloys having a high surface area and affinity for adsorbing hydrogen. Other active gaseous impurities such as CO, $CO_2$, $N_2$ and $H_2O$, which may find their way into the space, can also be thereby adsorbed.

Data published on the equilibrium of commercial hydrogen getters indicates that hydrogen getters may have an enormously increased capacity and gas adsorption rate with a relatively small reduction in temperature thereby greatly affecting the cost of a solar collector system. In order to maintain the capacity and rate of gas adsorption by the getter, the getter must be supported in the space between the TRA and the glass enclosure tube and be maintained at relatively low temperature. Thus, the getters should be as isolated as possible from heat transfer such as from conduction and radiation.

Radiation may come from either of two sources, one being radiation emitted off the TRA. Despite the fact that the TRA has a coating to limit emission, there is still a non-negligible amount of radiation that the TRA emits. The second radiation source potentially heating the getters is so-called missed solar radiation. This radiation can result from situations wherein some solar radiation is not solely reflectedly focused onto the TRA, but rather misses it. This is typically due to reflector mis-alignment or imperfect TRA mounting position. Some of this "missed solar radiation" may directly or indirectly contact the getters on their support and thereby heat them.

U.S. Pat. No. 4,306,543, to Doevenspeck et al, discloses a solar collector comprising a getter located within an evacuated transparent envelope defined by an outer glass tube and an inner metal tube. A rigid frame construction, extending between the glass and metal tubes, supports the getter and also supports a heater. The aim of the design is to provide a heating element in the evacuated envelope to crack hydrocarbons that may be present. However, the design does not provide protection for the getters from heating.

U.S. Pat. No. 4,455,998, to Kroontje et al, discloses a solar collector comprising a reversibly heatable hydrogen getter located within an evacuated transparent envelope defined by a glass tube. A reservoir formed in the glass tube supports the getter, which is covered by gauze. However, the reservoir is only described in regards to a plate-shaped absorber solar collector. Also, the reservoir requires a specially configured glass tube, the reservoir—being part of the glass tube—and this reservoir is not insulated from the heat absorbed by the glass tube. Further, the described assembly is designed to alternatively heat or not heat the getter in order to help control the temperature of heat transfer medium in the collector; not to maintain the getter at a low temperature.

U.S. Pat. No. 4,508,104, to Takeuchi et al, also discloses a solar collector comprising a getter located within an evacuated transparent envelope. A retaining device composed of leaf springs functions to fix the location of the inner tube of the collector with respect to the outer tube. The retaining device also supports a grommet-shaped casing of a "getter metal." The portion of the retaining device supporting the getter metal is only described as C-shaped and does not appear to protect the getter from solar radiation.

Accordingly, it is an object of the present invention to provide an assembly, for a solar energy collector system of the solar radiation focusing type, for supporting getters and maintaining them at relatively low temperature.

SUMMARY OF THE INVENTION

According to the present invention there is provided an assembly for supporting getters in an evacuated space between a tube radiation absorber (TRA) and the glass tube of a solar collector system, comprising a bridge for providing a gap between the getters and the tube radiation absorber wherein the bridge is designed and assembled of components to have minimal surface contact therebetween, thereby limiting conductive heat transfer.

According to the present invention there is provided such an assembly comprising a radiation protection arrangement for limiting solar radiation from reflecting and/or emitting onto the getters or onto a component (i.e. the bridge) in direct or indirect contact with the getters.

The present invention provides a getter support assembly for supporting getters in a solar collector system of the focusing collector type comprising a tube radiation absorber (TRA) and a glass enclosure tube, defining therebetween an annular space, and a solar radiation focusing reflector, said getter support assembly comprising, a bridge formed with an elongated trough having a getter support portion, the bridge further comprising feet fixedly attached to the tube radiation absorber supporting said trough so that the trough is spaced apart from said tube radiation absorber; the trough further comprising a radiation reflecting surface facing the TRA for blocking radiation emitted from the TRA and missed solar radiation reflected from the reflector.

According to one embodiment of the present invention, the bridge further comprises a component in addition to the trough, namely a radiation shield, to block and reflect radiation in order to minimize the temperature of the getters.

The bridge further comprises slots providing axial freedom of movement to allow for thermal expansion of the TRA and the bridge.

BRIEF DESCRIPTION OF THE DRAWINGS

In order to understand the invention and to see how it may be carried out in practice, embodiments will now be described, by way of a non-limiting example only, with reference to the accompanying drawings, in which.

DETAILED DESCRIPTION OF THE INVENTION

Figure 1:
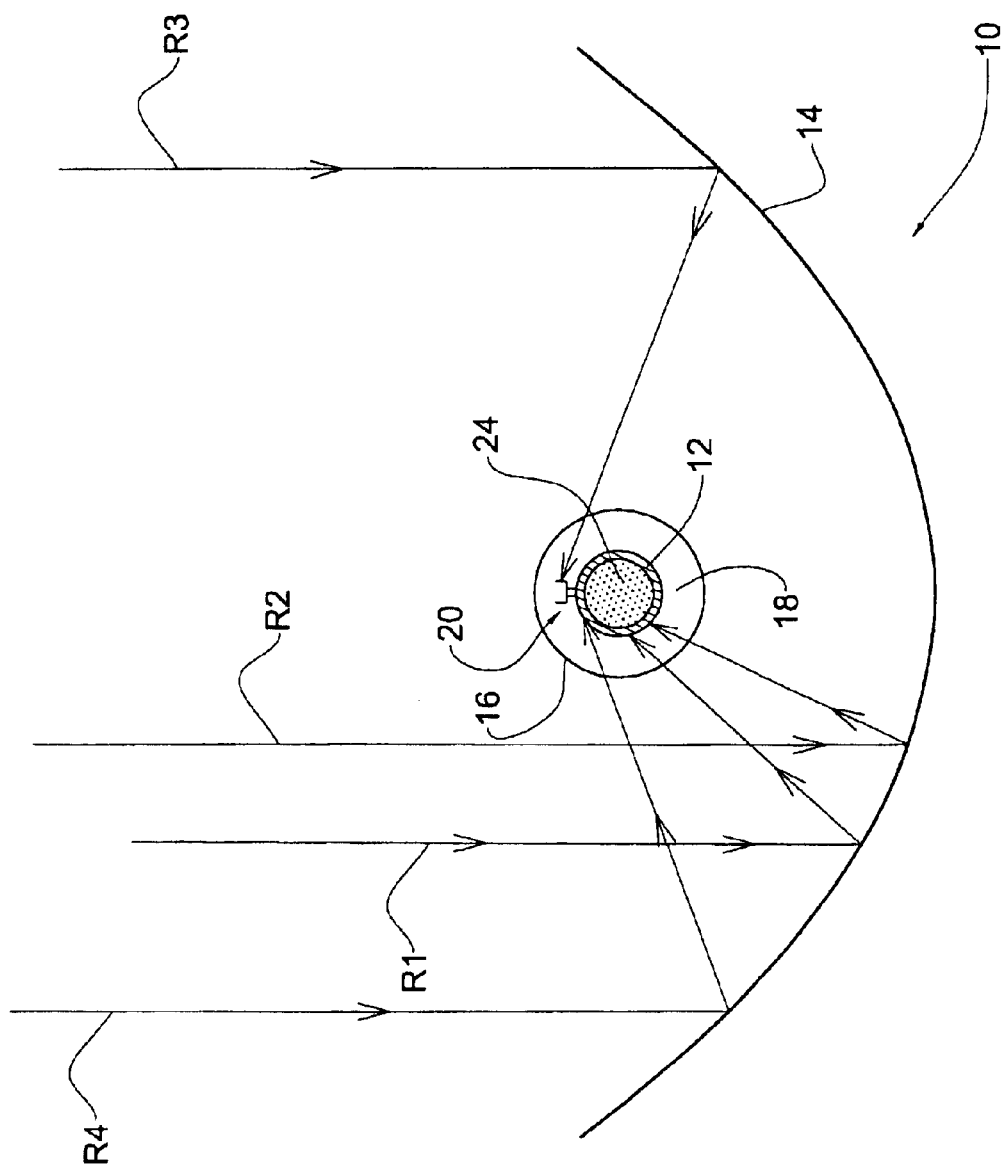
FIG. 1 is section of a solar energy absorber portion of a solar collector of the focusing collector type, fitted with a getter support assembly in accordance with the present invention.

Attention is first directed to FIG. 1 of the drawings showing a section of a solar energy absorber, generally designated 10, composing part of a solar collector system (not shown). Such a solar energy absorber 10, may be part of a solar field holding hundreds of meters of collector units. The collectors can be flat (plate) or non-flat collectors The solar energy absorber 10 comprises a tube radiation absorber or TRA 12, a reflector 14, and a glass enclosure tube 16. The TRA 12, which is coated with a solar radiation absorbing coating, is coaxially received within the glass enclosure tube 16 defining a space 18 therebetween, and is fixed at the focus of the reflector 14, which is typically parabolic.

Resting on the TRA 12 is a getter support assembly, generally designated 20, of an embodiment of the present invention shown in more detail in subsequent figures. It is noted that the assembly 20 is fixed in the so-called one-sun position wherein it faces toward the sun so as to ideally receive solar radiation only from rays directly from the sun and not from the much more concentrated rays reflected off the reflector 14.

Solar radiation rays R1 and R2 illustrate how the sun's rays reflect off the reflector 14, pass through the glass enclosure tube 16 and onto different locations of the TRA 12. In contrast, ray R3 illustrates radiation not reflected onto the TRA 12 rather onto the getter support assembly 20. This ray R3 represents so-called missed solar radiation that can heat the assembly 20 thereby reducing the gas adsorption capacity of the getters 30 (shown in FIG. 2).

It can be understood that other rays, for example ray R4, may reflect off the top of TRA 12 and onto the assembly 20, again, thereby heating the assembly and reducing the gas adsorption capacity of the getters 30.

Figure 2:
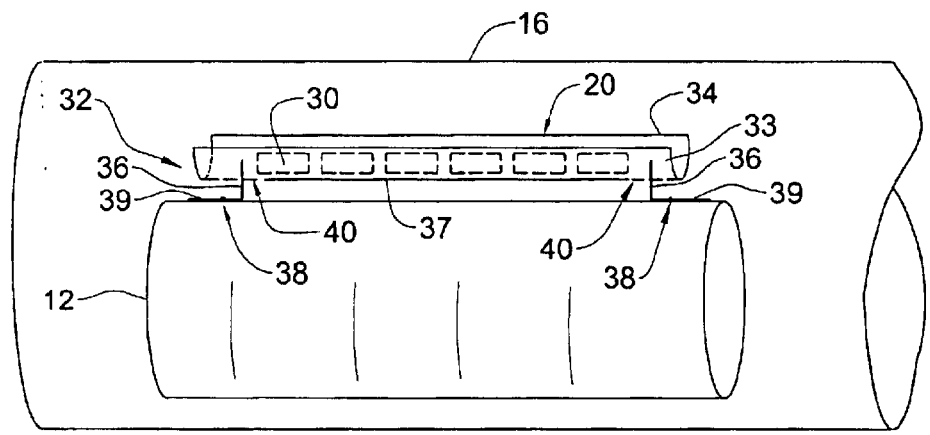
FIG. 2 is a perspective view of a tube radiation absorber (TRA) with a getter support assembly fixed thereon, according to an embodiment of the present invention.

FIG. 2 shows the assembly 20 atop the TRA 12. In its simplest form, the assembly 20 merely comprises a bridge 32 composed of a trough 34, holding the getters 30 (shown with phantom lines), and L-shaped metal feet 36. The feet 36 are typically made of a thin gauge sheet metal to limit the conduction path—as are all components associated with the assembly 20. The trough 34 has a getter support portion 37, upon which the getters 30 rest.

Some important features of the design can now be noticed. The feet 36 are attached to the TRA 12 at as limited a contact point(s) as possible, as illustrated by spot welds 38 at lower tabs 39 of feet 36. Similarly, the feet 36 and the trough 34 are typically in contact only, or mainly, at edges thereof thereby restricting thermal conduction therebetween.

Further, trough 34 has slots 40 (indicated by dashed lines) which not only allow the upper portion of feet 36 to pass through to stably support the trough, but also these slots extend in the longitudinal direction of the trough to allow for "play" between the trough and feet. There may also typically "play" in the transverse direction. This "play" eliminates issues involved with the different expansion of the bridge 32 and the TRA 12 which results during the heating and cooling cycles of the collector when alternately exposed and not exposed to the sun on a daily basis or due to passing clouds. At such times, the TRA 12 can heat up more quickly and become considerably hotter than the bridge 32, resulting in a different expansion and size relative to the bridge.

The trough 34 itself can act to reflect solar radiation—and would therefore typically be polished and/or coated, on at least its outer surface 33 (facing the TRA 12 and reflector 14); the coating typically consisting of a refractory metal such as silver or gold or other highly reflective materials, and/or the outer surface is polished, to reflect radiation both infrared and visible so that the trough is not heated and will not be a source of conduction to the getters 30.

Infrared radiation is emitted by the TRA 12 and visible radiation is reflected directly off the reflector 14 as illustrated by ray R3 in FIG. 1. However, as it will be understood to a person of the art, for protecting the trough 34 from solar radiation—and thus the getters 30 from high temperature—it may be preferable to employ one or more additional components to reflect the aforementioned radiation.

Figure 3:
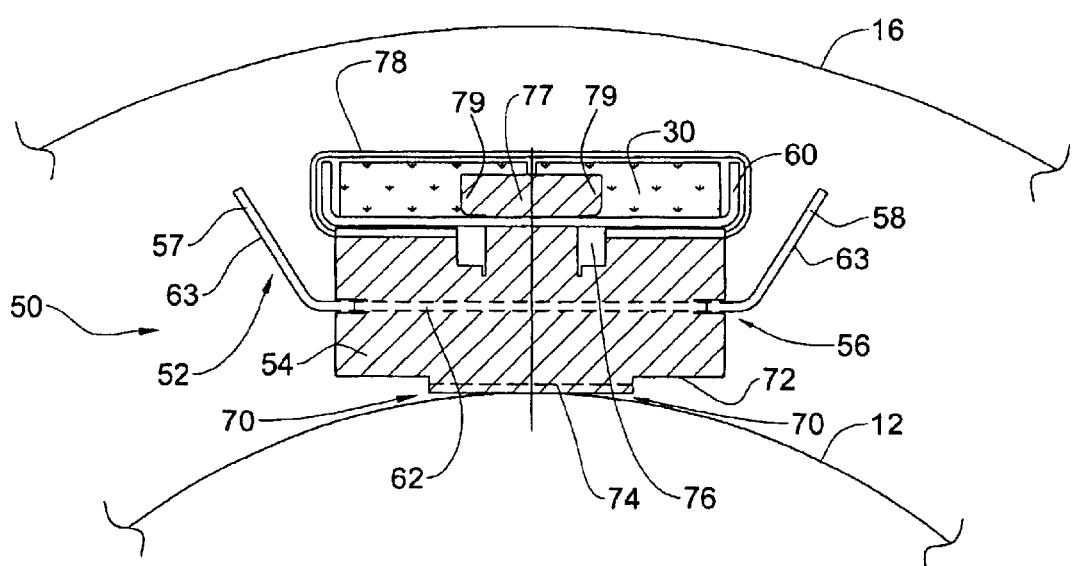
FIG. 3 is an end view of a different embodiment of a getter support assembly according to the present invention.

In another embodiment of the present invention, FIG. 3 shows an end view of an assembly 50 wherein such an additional component, a radiation shield 52, is provided. Only one radiation shield 52 is shown, but more than one can be used. The shield 52 is shown attached to feet 54, which in this embodiment have slots 56 for holding the shield. The shield 52 comprises wings or side-walls 57 and 58 that extend longitudinally the length of trough 60 (which now need not be dimensioned, polished and/or coated to block and reflect solar radiation). Shield 52 also has a base portion 62 (shown with phantom lines), between the side-walls 57 and 58, and extends under the portion of the trough 60 between the feet 54 (only one seen in FIG. 3). Tabs 74 (only one seen in FIG. 3) of feet 54 block radiation emitted from TRA 12 from reaching the ends of trough 60.

The shield 52 is most conveniently made of one piece and discussion of side-walls 57 and 58 and base portion 62 is to clarify the geometry of the shield and to emphasize that it reflects radiation from underneath (off the TRA 12) as well from the side (from the TRA 12, but also missed solar radiation from the reflector 14).

The shield 52, as with the trough 34 of the embodiment of FIG. 2, is typically coated and/or polished, on at least its surface 63 facing the TRA 12 and reflector 14, with an appropriate coating, typically consisting of a refractory metal such as silver or gold or other highly reflective materials, and/or the outer surface is polished, to reflect radiation so that it is not heated and will not be a source of conduction to the getters 30.

Additional important details of the present invention can now be observed. Between the TRA 12 and the feet 54 are wedge-shaped gaps 70 as the assembly 50 can be stably attached to the TRA 12 without need for the tabs 74 to conform to the cylindrical shape of the TRA. Also, outer lower portions 72 of the feet 54 do not extend down to the TRA 12. Both of these features help keep the temperature of the getters 30 at a minimum.

Further, the feet 54 have slots 76 contributing to a more limited heat transfer path from the TRA 12 to the getters 30 via the trough 60. Each of the feet 54 has a T-shaped extension 77 having side projections 79 to secure the trough 60, though the fit is not tight so as to allow "play" between the trough 60 and the feet 54.

Also seen in FIG. 3 is a covering 78 that may partly or completely surround the trough 60. This covering 78, is convenient for loading the getters 30 onto the trough 60 as they can be rapidly slid thereon, and the covering also prevents the getters from being displaced from the trough during assembly and operation of the solar collector system. The covering 78 may be a sleeve-like mesh (illustrated best in FIG. 4) so as to provide for open area and an easier path for the hydrogen or other gaseous impurities to approach and be adsorbed by the getters 30.

Figure 4:
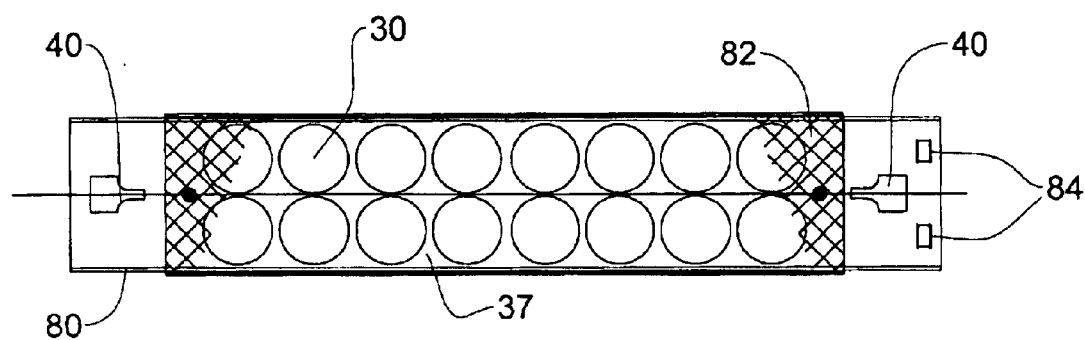
FIG. 4 is a top view of a getter supporting trough showing a trough covering according to a further embodiment of the present invention.

For clarification of certain components, FIG. 4 shows a top view of a trough 80 (which can be of a design similar to the aforementioned troughs 34, 60) showing an arrangement of a plurality of getters 30 sitting thereon, as well as a trough-covering in the form of a mesh 82. Also noted is a clearer exemplification of slots 40, which as understood in conjunction with FIG. 3, provide for freedom of movement or "play" between the feet 36, 54 especially in the longitudinal direction, although in the transverse direction as well, including angles in between, in order to allow for variation in thermal expansion between the TRA 12 and the bridge 32.

The trough 80 can further comprise, for example, auxiliary members 84 for purposes such as attaching other components as appropriate such as temperature indicators, etc.

Figure 5:
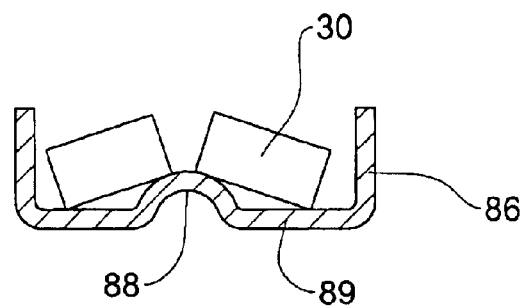
FIG. 5 is an end view of a modified trough of the getter assembly according to a further embodiment the present invention.

FIG. 5 illustrates a modification designed to further limit the conductive heat transfer to the getters 30 wherein a trough 86 comprises a ridge 88 running the length of the trough forming a getter support portion 89. As is seen, the getters 30 thereby have much more limited physical contact with the trough 86, thus limiting the conductive heat transfer path originating from the TRA 12.

It is understood that there are numerous patterns that could be produced in the getter support portion 37, 89 of the trough 34, 60, 80, 86 upon which the getters rest that would reduce the heat conduction between the trough and the getters—one example being dimples (not shown).

It should be noted that various components of the getter support assembly described above, as well as variations thereof are provided merely by way of illustration and are by no means exclusive, and many variations and modifications thereof are possible.

For example, the radiation shield 52 could be attached to the TRA 12 or to the trough 60 instead of to feet 54.

In another example, the trough 34, 60, 80, 86 of any of the above embodiments could be formed to curl in on itself to help secure the getters 30 thereon. Or, in the embodiment wherein the getter support assembly 50 has a shield 52, the trough could be wholly or partly perforated, thereby providing less of a conductive heat transfer path. In a combination of the aforementioned, the trough 34, 60, 80, 86 could be perforated and curled in on itself, or even tube-shaped, thus securing the getters 30 and still allowing hydrogen or other gaseous impurities relatively free access to the getters—serving in a manner analogous to mesh 82.

It will be appreciated that the above descriptions are intended only to serve as examples, and that many other embodiments are possible within the spirit and scope of the present invention.

What is claimed is:

1. A getter support assembly for supporting getters in a focusing collector type solar collector system comprising a tube radiation absorber (TRA) and a glass enclosure tube, defining therebetween an annular space, and a solar radiation focusing reflector, said getter support assembly comprising, a bridge formed with an elongated trough having a getter support portion, the bridge further comprising feet fixedly attached to the tube radiation absorber supporting said trough so that the trough is spaced apart from said tube radiation absorber; the trough further comprising a radiation reflecting surface facing the TRA for blocking radiation emitted from the TRA and missed solar radiation reflected from the reflector.

2. The getter support assembly according to claim 1, wherein the getters are hydrogen getters.

3. The getter support assembly according to claim 1, wherein the radiation reflecting surface reflects both infrared and visible radiation.

4. The getter support assembly according to claim 1, wherein there is at least axial freedom of movement between the trough and the feet to allow for variation in thermal expansion between the TRA and the bridge.

5. The getter support assembly according to claim 4, wherein the freedom of movement is facilitated by slots in the trough that are larger in their longitudinal dimension than a part of the feet interfacing with said trough.

6. The getter support assembly according to claim 1, wherein the feet are each fixedly attached to the tube radiation absorber (TRA) only at a point.

7. The getter support assembly according to claim 1, wherein the getter support portion of the trough upon which the getters rest is a non-flat surface.

8. The getter support assembly according to claim 1, wherein the assembly further comprises a trough covering, which may facilitate loading and holding the getters thereon.

9. The getter support assembly according to claim 8, wherein the covering is a mesh-like component.

10. The getter support assembly according to claim 1, wherein the assembly further comprises one or more radiation shields, extending below and to the sides of the trough, and has a base and side-walls for blocking radiation emitted from the tube radiation absorber (TRA) and missed solar radiation reflected from the reflector.

11. The getter support assembly according to claim 10, wherein the one or more radiation shields comprises a radiation reflective coating at least on an outer surface thereof.

12. The getter support assembly according to claim 10, wherein the one or more radiation shields are attached to the feet of the assembly.

13. The getter support assembly according to claim 1, wherein there are interconnections between the feet and the trough which are at edges thereof.

14. A solar collector system comprising a solar heat absorber, comprising a parabolic reflector, a tube radiation absorber (TRA) and a glass enclosure tube, wherein said solar collector system further comprises a getter support assembly comprising, a bridge formed with an elongated trough having a getter support portion for supporting getters, the bridge further comprising feet fixedly attached to the tube radiation absorber supporting said trough so that the trough is spaced apart from said tube radiation absorber; the trough further comprising a radiation reflecting surface facing the TRA for blocking radiation emitted from the TRA and missed solar radiation reflected from the reflector.

15. The getter support assembly according to claim 14, wherein the getters are hydrogen getters.

16. The getter support assembly according to claim 14, wherein there is at least axial freedom of movement between the trough and the feet to allow for variation in thermal expansion between the TRA and the bridge.

17. The getter support assembly according to claim 14, wherein the assembly further comprises a radiation shield, extending below and to the sides of the trough, and has a base and side-walls for blocking radiation emitted from the tube radiation absorber (TRA) and missed solar radiation reflected from the reflector.

18. The getter support assembly according to claim 17, wherein the radiation shield comprises a radiation reflective coating at least on an outer surface thereof.

19. A solar energy absorber comprising a parabolic reflector a tube radiation absorber (TRA) and a glass enclosure tube, said solar heat absorber further comprising a getter support assembly comprising, a bridge formed with an elongated trough having a getter support portion for supporting getters, the bridge further comprising feet fixedly attached to the tube radiation absorber supporting said trough so that the trough is spaced apart from said tube radiation absorber; the trough further comprising a radiation reflecting surface facing the TRA for blocking radiation emitted from the TRA and missed solar radiation reflected from the reflector.

20. The getter support assembly according to claim 19, wherein the getters are hydrogen getters.

21. The getter support assembly according to claim 19, wherein there is at least axial freedom of movement between the trough and the feet to allow for variation in thermal expansion between the TRA and the bridge.

22. The getter support assembly according to claim 19, wherein the assembly further comprises a radiation shield, extending below and to the sides of the trough, and has a base and side-walls for blocking radiation emitted from the tube radiation absorber (TRA) and missed solar radiation reflected from the reflector.

23. The getter support assembly according to claim 22, wherein the radiation shield comprises a radiation reflective coating at least on an outer surface thereof.

* * * * *